United States Patent [19]

Gullickson

[11] 3,731,582

[45] May 8, 1973

[54] SIGHT AND SOUND TEACHING AID FOR KEYBOARD INSTRUMENTS

[76] Inventor: Cecil F. Gullickson, 2018 Fosgate Drive, Winter Park, Fla. 32789

[22] Filed: July 14, 1970

[21] Appl. No.: 54,733

[52] U.S. Cl. ................................................84/478
[51] Int. Cl. ............................................G09b 15/08
[58] Field of Search ....................84/1.26, 1.28, 470, 84/477, 478, 171, 20

[56] References Cited

UNITED STATES PATENTS

| | | | |
|---|---|---|---|
| 2,820,391 | 1/1958 | Janssen et al. | 84/478 X |
| 3,377,716 | 4/1968 | Schmoyer | 84/478 |
| 3,456,546 | 7/1969 | Welsh et al. | 84/478 |
| 2,779,920 | 1/1957 | Petroff | 84/464 X |
| 3,196,729 | 7/1965 | Burns et al. | 84/171 |
| 3,539,701 | 11/1970 | Milde | 84/1.26 X |

Primary Examiner—Richard B. Wilkinson
Assistant Examiner—Lawrence R. Franklin
Attorney—Julian C. Renfro

[57] ABSTRACT

A sight and sound instructional arrangement for use in conjunction with a keyboard instrument, involving the use of illumination means associated with certain keys of the keyboard instrument, in conjunction with means sensitive to certain frequencies and connected to turn on the illumination means upon these certain frequencies being received by the frequency-sensitive means. This arrangement is particularly suitable for use by a beginning musician inasmuch as by the use of this invention, he or she can see certain keys illuminated at such time as the frequency-sensitive means receives the preascertained frequencies. One preferred embodiment of this invention involves the use of instructional tapes containing voice instruction for the beginning musician as well as tones or frequencies for causing keys appropriate to the instruction to be illuminated at the proper time.

1 Claim, 5 Drawing Figures

INVENTOR
CECIL F. GULLICKSON

INVENTOR
CECIL F. GULLICKSON

ATTORNEY

INVENTOR
CECIL F. GULLICKSON
ATTORNEY

{ 3,731,582 }

SIGHT AND SOUND TEACHING AID FOR KEYBOARD INSTRUMENTS

REFERENCE TO RELATED INVENTIONS

This invention is related to my patent entitled "-Music Teaching Aid", U.S. Pat. No. 3,415,152, which issued Dec. 10, 1968, as well as to my co-pending application entitled "Musical Chord System Utilizing Symbols", Ser. No. 867,517, filed Oct. 20, 1969 now abandoned.

BACKGROUND OF THE INVENTION

1. Field of the Invention

This invention pertains to aids to be used by an amateur musician when learning to play a keyboard instrument, so that he or she can be instructed as to the precise location of keys on the keyboard that are to be associated with certain frequencies or melodies.

2. Description of the Prior Art

A number of aids for use with keyboard instruments have been proposed in the past, but these have usually been either comparatively ineffective, or else have been large and expensive. Certain tapes have been available that contained specific instruction as to the manner in which the beginning musician placed his hands on the keyboard, and some of these tapes have even contained tones such that the student could ascertain when he had selected the proper note to be played. Other tapes have contained accompaniments such that the student could play along with the tape, with the melody he provided hopefully blending with the accompaniment the tape was providing.

Other more elaborate means have been proposed which would entail the use of an instructor's keyboard and a student's keyboard utilized in conjunction with a tape playing arrangement. Some advantages are made possible by such an arrangement, such as the instructor being able to interpose additional teaching assistance over and above that being presented by the tape. However, few purchasers can afford the expense involved in an arrangement of this type, and the space involved in such a device is so great as to make it impractical for use in the average home.

SUMMARY OF THIS INVENTION

This invention represents a highly satisfactory yet low cost arrangement for indicating to beginning musicians the precise locations of certain keys on the keyboard of a musical instrument, which keys, when struck in response to the illumination thereof, bring about the student playing a simple or eventually a complicated melody. It comprises illumination means associated with certain keys of the musical instrument, and frequency-sensitive means sensitive to frequencies corresponding to certain notes of the keyboard. Thus, in response to the frequency-sensitive means being subjected to certain frequencies or tones, the illumination means associated with the keys are caused to be illuminated in a manner appropriate to the playing of a selected melody.

Although this invention can be put to a wide range of uses, a preferred arrangement involves utilization in conjunction with an instructional tape that is prerecorded to contain voice instruction as well as accompanying notes or tones, with these notes or tones causing through the frequency-sensitive means, the sequential illumination of the lighting means associated with certain keys of the keyboard. As should quickly become apparent, this amounts to a sight and sound instruction such that a vocal recording can explain to the student the technique that is to be developed, and the keys illuminated at an appropriate time so as to unerringly indicate the keys upon which the student should place his hands in order to bring about the playing of the chosen piece of music.

Quite obviously, this invention can be utilized with a wide range of keyboard instruments, including piano, harpsichord, and organ, and can even include the illumination of either or both keyboards of the organ, and even the bass pedals that may be involved.

In contrast with certain prior art arrangements, the practice of my invention entails the use of no additional keyboards requiring the presence of the instructor, and because the present sight and sound instruction amounts to such a highly effective technique, it is possible for the beginning musician to be playing recognizable melodies at a much faster rate than was ever previously possible. The instructional tapes can be played either by a tape player built into the keyboard instrument, or alternatively, by an ancillary piece of equipment. Quite obviously the tape can be played over and over at the behest of the student until such time as he or she has mastered each portion of the melody.

In the typical instance, the tape is a magnetic tape played on an appropriate tape player, and although the tape can be a single channel tape containing both oral instruction as well as tones or frequencies to trigger the illumination means, I preferably use a multi-channel tape in which one of the channels contains voice instruction, and the other channel or channels contain the frequencies or tones utilized for contemporaneously bringing about the illumination of certain selected keys as a helpful supplement to the spoken instruction.

There are obviously a wide variety of ways in which my sight and sound instructional technique can be utilized in the average home for instructing a student in the playing of a keyboard instrument. In the interests of providing an arrangement which is practical and economical and that can be afforded by the average home, I preferably utilize cassette type tapes, with the tape player either being separate or built into the musical instrument itself.

In order to extract the tonal information from the tape and utilize it in the most straightforward manner for the selective illumination of the bulbs, I preferably utilize decoding means employing frequency-sensitive means, such as frequency-sensitive reed relays or the like. A graduated series of these frequency-sensitive means are typically contained in the decoder, whose outputs are connected to the illumination means associated with the keyboard. The input to the decoder may of course be the aforementioned tape player, but it is obviously within the spirit of my invention to have a wide variety of possible inputs to the decoder, such as a microphone, a guitar, or the like, so that a wide variety of musical or tonal inputs may be utilized as may be desired. For example, the playing of a guitar in the room with the keyboard instrument may bring about the illumination of the keys of the instrument in such a manner that the beginning musician can be easily guided in playing an effective accompaniment for the guitar.

As another facet of the invention, I can provide a selector switch arrangement that, upon being suitably manipulated by the student, can cause the actual striking of the strings in the case of a piano, or the actual operation of the tone generators of an organ, in response to the playing of certain tones or frequencies into the input of the decoder.

In its simplest form, the relay receiving its particular signal from the tape serves to close its contacts, causing a current to flow from a power source, thus illuminating the respective bulb on the keyboard. However, practice has shown that more sophisticated circuitry is necessary to assure consistent performance, especially when several keys are displayed simultaneously.

The preferred embodiment of my invention entails the use of a transistorized amplifier to strengthen signals received from the tape to a proper working level before they are received by the frequency sensitive decoding relays. The amplified signal is impressed upon the decoding relay bank, and in accordance with my invention, only one selected relay responds to each signal. As is obvious, two or three or more signals may be simultaneously delivered to the relay bank. As the relay contacts close, current is caused to flow to a transistorized switching means, which is employed to do the actual work of switching power to the desired bulbs in, on, or adjacent the keyboard. Because of the use of the transistorized switching means, only a small current need flow through the relay contacts, thus assuring long life and dependable performance. Although the speed of response is not instantaneous, the speed with which a series of frequencies in a melody can cause he respective bulbs to light is more than adequate for instructional purposes.

It is the primary object of my invention to provide an audio and visual teaching aid for keyboard instruments which is economical enough to be afforded by virtually every home equipped with a keyboard instrument.

It is another object of my invention to provide a keyboard type musical instrument with a tape unit such that both oral and visual instruction may be contemporaneously provided to a beginning musician, utilizing only the original keyboard or keyboards inherent in that instrument design.

It is still another object of my invention to provide an illuminated keyboard arrangement whose illumination means are selectively operated at a most economical manner in concert with oral instruction, with both the means for causing selective illumination of the keyboard and the oral instruction being contained on a single tape.

It is yet still another object of my invention to provide a most effective arrangement by the use of which instruction may be provided for a keyboard instrument, with the beginning musician being reached by auditory and visual means coordinated in a highly effective and interesting manner.

Yet another object of my invention is to provide an arrangement in which the student can selectively cause keys to be struck or notes played automatically by the keyboard instrument, rather than merely the keyboard lights being turned on by the playing of a melody.

These and other objects, features and advantages will become more apparent from a study of the appended drawings in which.

Figure 4:
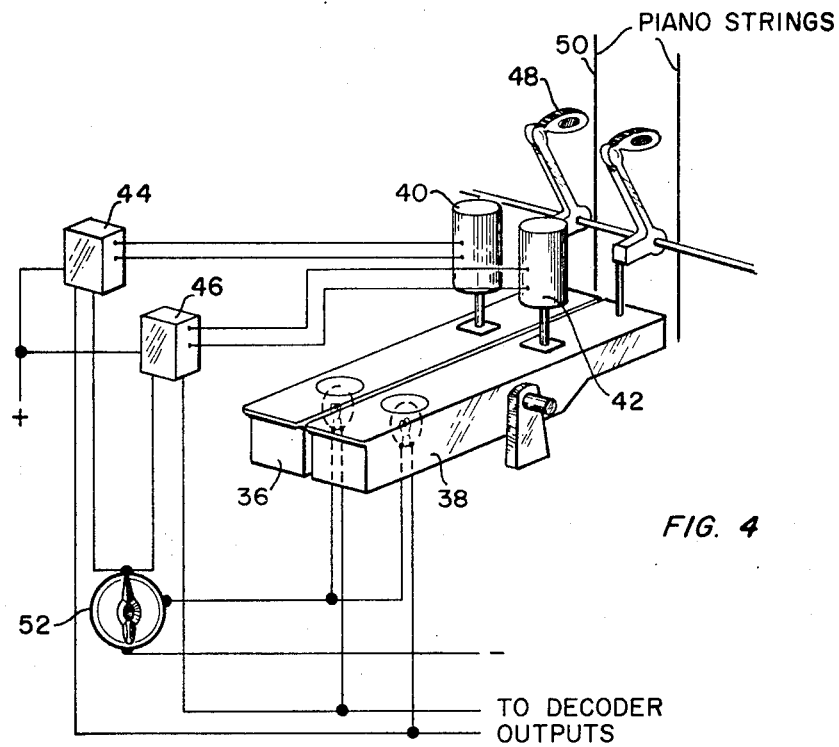
Figure 5:
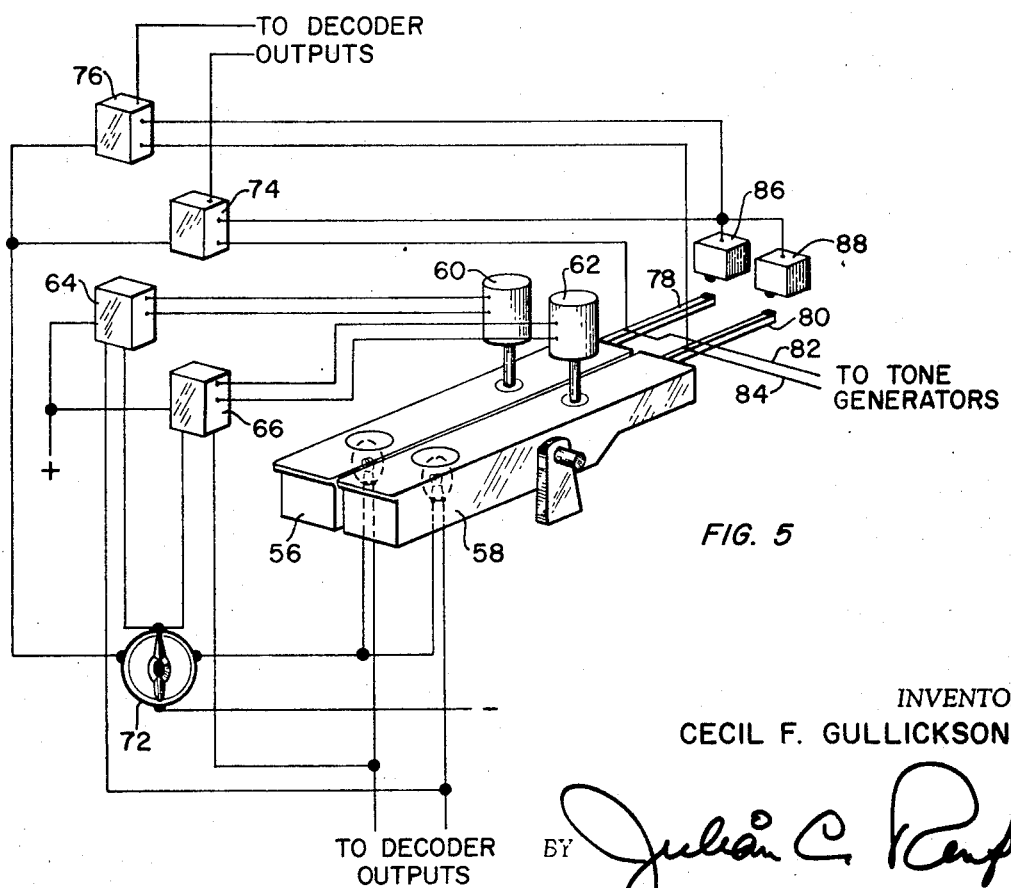

FIG. 4 is a schematic representation of an arrangement by which decoder inputs to the keys of a piano can be utilized for causing the hammers associated with the keys to strike respective strings when certain frequencies are received; and FIG. 5 is a schematic of an arrangement by which decoder inputs to the keys of an organ can be utilized for causing the tone generators of the organ to be actuated when certain frequencies are received.

Figure 1:
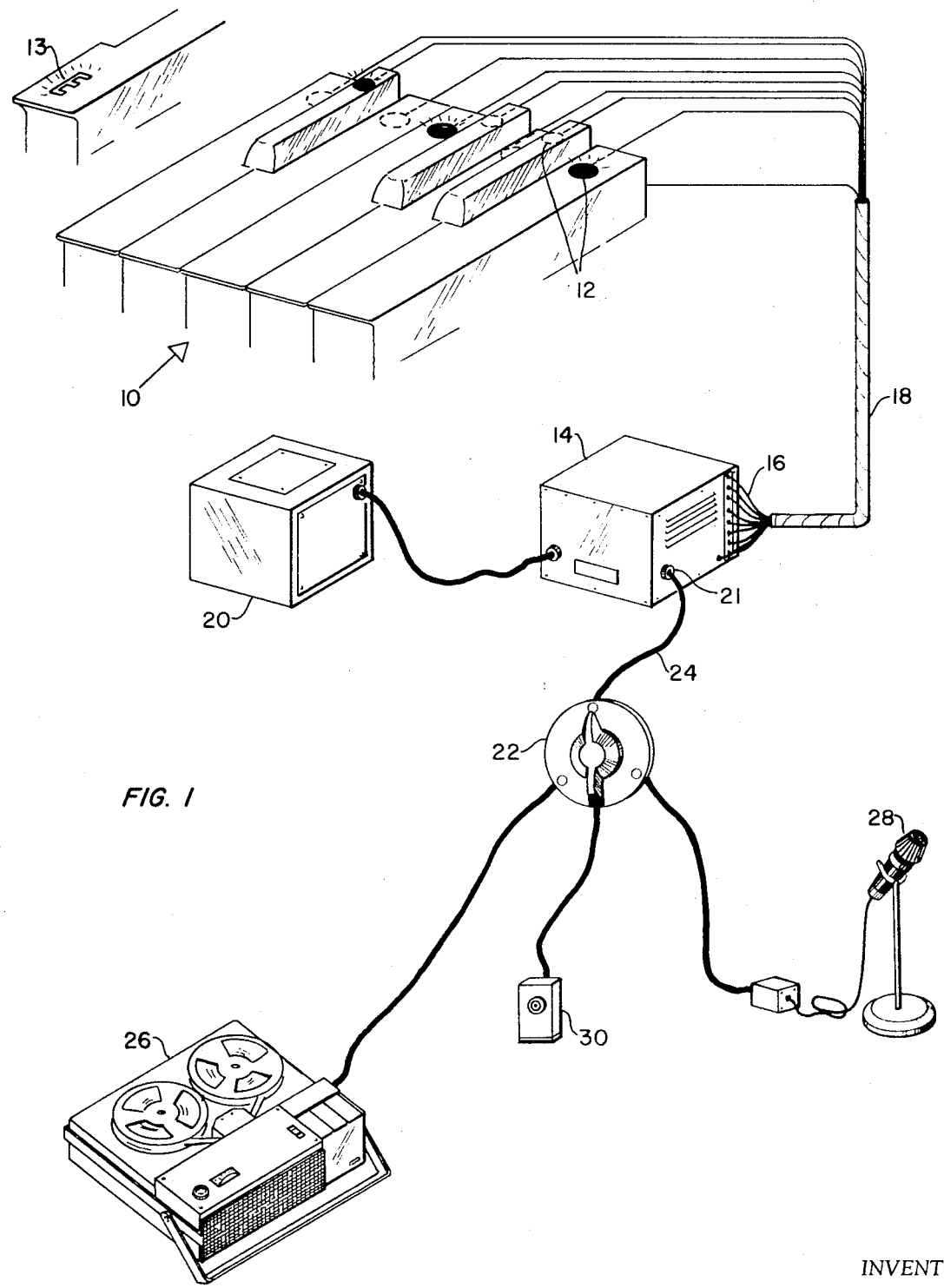
FIG. 1 is a schematic representation of the relationship between a keyboard, decoder, and various input means for the decoder.

Turning to FIG. 1, it will be seen that in this exemplarly embodiment of this invention, I have shown a portion 10 of the keyboard of a keyboard instrument upon which instruction is to be given to someone such as a beginning musician. This keyboard section represents a plurality of black and white keys, with each of these keys being equipped with an illumination source. For example, individual bulbs may be contained within the confines of the keys in approximately the positions indicated at 12, such that when illuminated, these bulbs clearly indicate to the student which key or group of keys is to be struck.

As set forth in my copending patent application entitled "Musical Chord System Utilizing Symbols", Ser. No. 867,517, filed Oct. 20, 1969, the illumination means may be disposed below certain indicia, such as under the letter E as shown at 13 in the fragmentary view adjacent the keyboard portion 10. Electric wires are used for carrying current to the illumination means.

Obviously, I am not to be limited to this arrangement, for the illumination means can be in the form of a light bar disposed above the upper rear portion of the keys, or for that matter any of a number of other individually operable illumination means can be utilized such that the keys to be struck by the student can be clearly indicated. Reference should be had to my patent entitled "Music Teaching Aid", Pat. No. 3,415,152, which issued Dec. 10, 1968 for additional pertinent detail.

Most significantly, a multi-channel decoder 14 having a number of output terminals 16 is provided in FIG. 1, with the arrangement being such that each wire connected to each illumination means is also connected to a respective terminal of the decoder, this being accomplished through an electrical cable 18. Thus, when the circuit associated with a given bulb or group of bulbs is caused to close in accordance with the operation of my invention, an electrical current is caused to flow to the selected bulbs. An appropriate power supply 20 connected to the multi-channel decoder 14 is provided to supply the current the passes through the illuminating means.

Although a number of different decoders could be utilized, I prefer to use a decoder 14 utilizing frequency sensitive relays. These frequency sensitive relays may be of the reed type shown in FIGS. 2 and 3, or may even be of a more elaborate type, involving a form of tuning fork. These relays will be discussed in greater detail hereinafter, and it should now suffice to say that the multi-channel decoder 14 comprises a number of devices or components that are tuned so as to be sensitive to specific frequencies or tones associated with selected keys of the keyboard instrument. Thus, upon the decoder receiving at its input 21, certain tones from certain ancillary equipment, these frequency sensitive relays can be caused to operate in a specific and predictable manner so as to bring about the illumination of specific ones of the illuminating means associated with the keys.

It will be noted in FIG. 1 that I have shown a multi-position switch 22 disposed in the electric cable 24 connected to the input 21 of the decoder, with it being within the scope of this invention to enable an operator to manipulate the switch to determine the type of input or signal being delivered to the input 21 of the decoder. For example, by disposing the selector switch in one position, an input from tape player 26 can be caused to be delivered to the decoder, which input may be in the form of musical tones or other coded frequencies. Although I have shown in FIG. 1 a standard size tape player 26, I am obviously not to be limited to such a large device for it is within the spirit of my invention to also utilize a cassette type tape player, utilizing tapes containing oral instruction as well as musical tones. Obviously, I can use either a single channel tape player, or a multi-channel device, with the multi-channel device being preferred, providing means whereby the oral instruction can be in one channel and the coded frequencies or tones delivered to the decoder in a separate channel.

As should now be apparent, the beginning musician can obtain a pre-recorded instructional tape that will contain oral instruction that he can hear over the loudspeaker of the tape player, and by virtue of my invention, or or she can also see certain keys of the keyboard illuminated, thus specifically indicating which keys should be struck at a certain time in order to bring about the playing of a chord or melody forming a part of the taped instruction.

By turning the selector switch 22 to a different location, the microphone 28 may be connected to the input of the multi-channel decoder 14, thus enabling musical ones received by the microphone to be converted by the illuminated keys to a proper representation of the melody. Obviously, by humming or singing into the microphone, the keys associated with a certain melody can thus be caused to become illuminated, greatly simplifying the efforts of a beginning musician to find the specific keys whose operation will enable him or her to play a favorite melody.

By turning the selector switch 22 to yet a different position, an alternate input jack 30 can be connected to the decoder, thus enabling tones from any other tone-producing or frequency-producing device to be fed into the decoder 14. An example of this other device may be an electric guitar. The use of this arrangement obviously permits a beginning musician to accompany a guitarist with but a minimum of instruction, merely by following the keys of the keyboard instrument as they become illuminated by the tones from the guitar.

Figure 2:
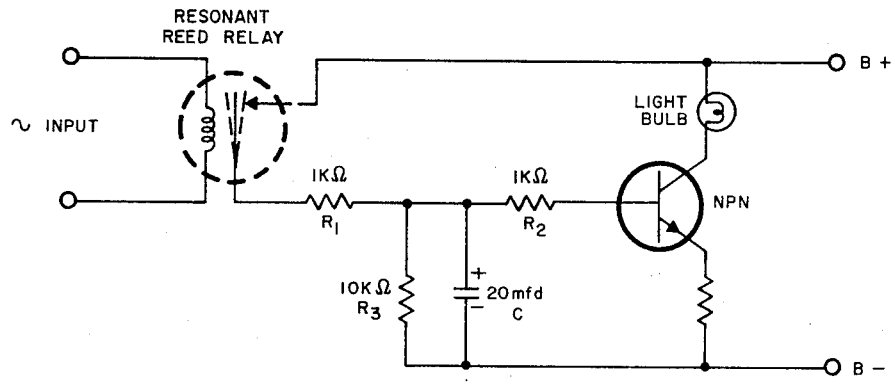
FIG. 2 is a typical circuit of a reed relay arranged to turn on a bulb, which bulb may be disposed in one of the keys of the keyboard of FIG. 1.

Turning now to FIG. 2, it will be seen that I have shown a well known configuration of a resonant reed relay that is arranged to serve as a frequency sensitive relay in accordance with this invention. This device receives an input into its input portion, and is sensitive to a certain frequency contained in the input. When reed contacts close, capacitor C and resistor R1 integrate the duty cycle and cause the transistor to conduct, lighting the light bulb. The bulb remains on as long as the reed contacts make intermittent closure. When closure stops, R3 bleeds off C and the transistor and bulb revert to the normally off mode. The resistor R3 can be sized as appropriate to control this bleed off.

Other details of resonant reed relays are to be found in a publication "Control Techniques with Resonant Reed Relays" published by Bramco Controls Division, Ledex Inc., Piqua, Ohio. This booklet contains a wide range of reed relays selectable on the basis of frequencies to which they are sensitive.

Figure 3:
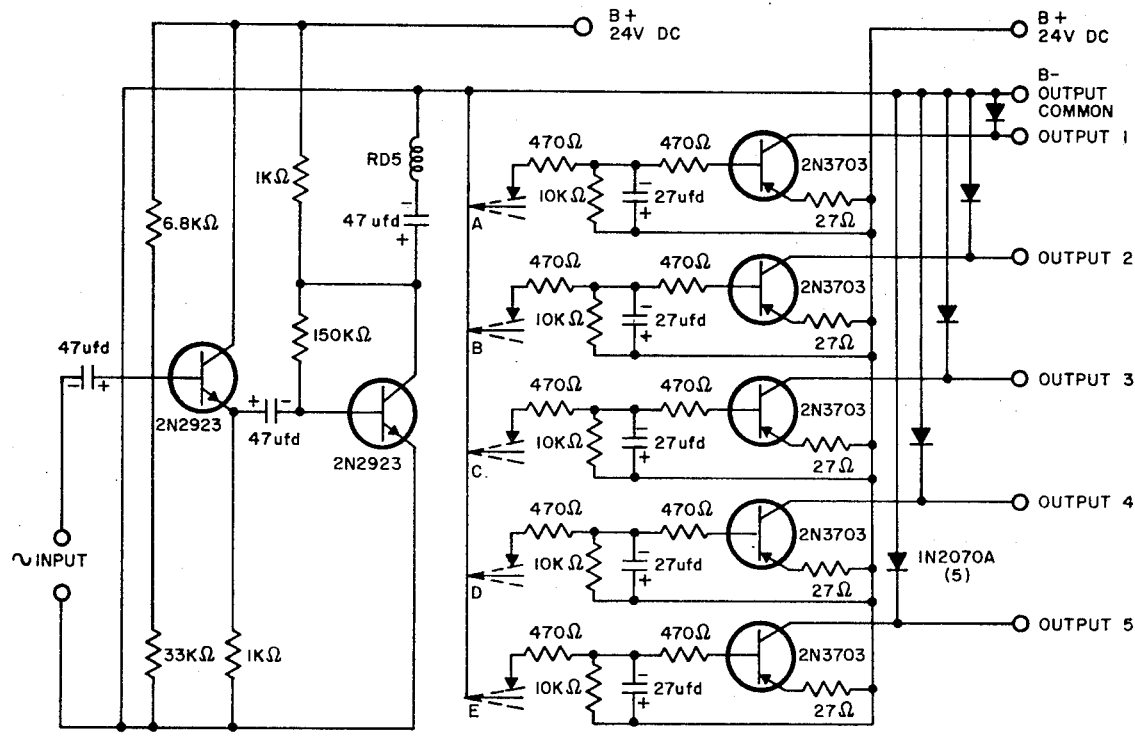
FIG. 3 is a more involved reed relay arrangement, in which a graduated series of reed relays are used to turn on respective adjacent bulbs of a keyboard.

FIG. 3 reveals a typical configuration wherein a plurality of frequency sensitive relays are utilized in an arrangement involving an input means, amplifier means, and transistors associated with each relay and functioning to complete a circuit to a specific output. FIG. 3 happens to show five frequency sensitive relays and outputs 1 through 5, but it is of course to be understood that the arrangement may include a much larger number of frequency-sensitive components and of course a larger number of outputs. For example, my decoder can entail the use of frequency sensitive relays to such an extent that say three octaves of separate musical tones can be recognized, and the light bulbs associated with these tones deployed in keys of the keyboard instrument caused to illuminate when these tones are received. I cite this number of octaves purely by way of example, and quite obviously either a larger or smaller number of relays and circuits may be utilized as desired. Also, keys may be illuminated on one or more keyboards of an organ, and also caused to illuminate organ base pedals, if desired.

The frequency sensitive relays used are sufficiently discriminative to accurately receive and display chromatic or semitones of the musical scale.

Turning now to FIG. 4, I have there illustrated an exemplary embodiment of an arrangement by the use of which the melody being played by a tape player for example, may bring about the actual striking of the keys of a piano.

In this embodiment, I utilize piano keys 36 and 38 that are fulcrumed at approximately their mid-point in such a way that movement of these keys causes a hammer to strike an adjacent piano string, irrespective of whether the front or forward portion of the key is pushed down, or the rear portion of the key is pulled up. Upward movement of the rear portion of either of these keys in other words causes a movement of the respective hammer to and against the respective string, thus of course enabling the piano to be played in a conventional manner. However, this embodiment also utilizes solenoids 40 and 42 in association with these keys, as well as relays 44 and 46 associated with these solenoids. Thus, upon closing of the relay 44, for example, the solenoid 40 connected to that relay is caused to be actuated, and upon being actuated, causes the rear portion of the key to be raised, thus bringing about a striking of the piano string 50 by hammer 48 in the manner previously described. Obviously, the two relays 44 and 46 shown in this figure can be of a conventional type, that are arranged to direct a comparatively heavy current through the piano key solenoids 40 and 42 upon a comparatively small current being received from another source, preferably the decoder 14. A switch 52 enables the user to select between the automatic playing of the keys through solenoid means, and the manual operation of the keys in response to the illumination thereof.

In the preferred instance, the current bringing about a closing of relays 44 and 46 is from frequency sensitive relays such as is shown in FIG. 2, which relays form a part of a decoder. Thus, in addition to the bringing about of the selected illumination of the keys in accordance with the embodiment described in FIG. 1, I can simultaneously cause the actual notes to be struck and played. In this manner, a tape recorder song can be caused to be played in much the manner of a player piano with much less expense than is usually associated with such a function.

Turning to FIG. 5, I have there shown two typical keys, 56 and 58, of an organ keyboard, in conjunction with a relay and solenoid system somewhat similar to that of FIG. 4. In this instance, solenoids 60 and 62 are utilized for an automatic playing of these keys in response to signals from the respective decoder. More particularly, upon relays 64 and 66 being caused to close as a result of the respective decoder responding to certain tones, the solenoids 60 and 62 are caused to actuate, and lift the rear portion of the keys. I can use the solenoids to move the keys of the organ thus closing the switches, or alternatively, in certain organs where a system allows, I can use a relay similar to the ordinary relays of FIG. 4 to do the actual closing of the switches of the organ keys thereby bringing about the playing of the melody.

This action of the keys results in the organ keying switches 78 or 80 being moved into contact with contacts 86 and 88, thus completing through respective leads 82 or 84, the circuits through respective organ tone generators (not shown).

Movement of the switch 72 counterclockwise to what may be regarded as the 9 o'clock position energizes relays 74 and 76 to a state of readiness to receive signals from the decoder. As an example, if relay 74 receives an output-signal from the decoder, this will cause a circuit to be closed corresponding to contact 78 closing with contact 86, and resulting in the equivalent tone generator response as would have resulted from a mechanical movement of the key.

Movement of the switch to the 3 o'clock position will place the key illumination means in the circuit with the decoder outputs to bring about the selective illumination of the keys for the purpose of manual playing, without any automatic features being involved.

I claim:

1. A sight and sound instructional apparatus for use in conjunction with a keyboard musical instrument comprising a magnetic tape player having means for audibly emitting musical tones coded on a sound channel of a magnetic tape in terms of their respective frequencies and also being electrically connected to a decoder, said decoder having a plurality of frequency sensitive means each of which is activated by a different one of the said frequencies, said decoder being electrically connected to a plurality of lights each of which is associated with a key of said keyboard instrument which plays a tone corresponding to the frequency decoded, the frequency sensitive means of said decoder also being electrically connected to means for causing the keyboard instrument to play said musical tones corresponding to signals on the sound channel of the tape so that a student may hear the tones from said emitting means and the keyboard tones and simultaneously see lights associated with keys corresponding to the tones being played.

* * * * *